US011841260B2

(12) United States Patent
Storch

(10) Patent No.: US 11,841,260 B2
(45) Date of Patent: Dec. 12, 2023

(54) FILL LEVEL SENSOR FOR DETECTING A FILL LEVEL OF A FILL MEDIUM IN A CONTAINER

(71) Applicant: KROHNE Messtechnik GmbH, Duisburg (DE)

(72) Inventor: Robert Storch, Lüdenscheid (DE)

( * ) Notice: Subject to any disclaimer, the term of this patent is extended or adjusted under 35 U.S.C. 154(b) by 335 days.

(21) Appl. No.: 17/149,957

(22) Filed: Jan. 15, 2021

(65) Prior Publication Data

US 2021/0223088 A1 Jul. 22, 2021

(30) Foreign Application Priority Data

Jan. 16, 2020 (DE) ..................... 10 2020 100 998.4
Jun. 10, 2020 (DE) ..................... 10 2020 115 459.3

(51) Int. Cl.
*G01F 23/284* (2006.01)
*H01Q 13/02* (2006.01)

(52) U.S. Cl.
CPC ........... *G01F 23/284* (2013.01); *H01Q 13/02* (2013.01)

(58) Field of Classification Search
CPC .............................. G01F 23/284; H01Q 13/02
See application file for complete search history.

(56) References Cited

U.S. PATENT DOCUMENTS 5,048,335 A * 9/1991 Marsh ................... G01F 23/265 73/304 C
5,675,259 A * 10/1997 Arndt ........................ G01F 1/66 324/642
5,736,901 A * 4/1998 Nakamura .............. H03F 1/086 330/296
6,640,628 B2 * 11/2003 Lutke .................... G01F 23/284 367/908
6,831,470 B2 12/2004 Xie et al.
6,914,555 B2 * 7/2005 Lipscomb .......... G01N 35/1009 73/290 R (Continued)

FOREIGN PATENT DOCUMENTS

DE 102018111058 A1 11/2019
EP 3428631 A2 1/2019
WO 2019215118 A1 11/2019

OTHER PUBLICATIONS

European Search Report; Application No. EP 21 15 1363; dated May 26, 2021; 2 Pages.

*Primary Examiner* — Marcus E Windrich
(74) *Attorney, Agent, or Firm* — Patrick D. Duplessis

(57) ABSTRACT

A fill level sensor for detecting a level of a fill medium in a container includes a generator having a feed line, an antenna, a supply and a controller. The generator generates electromagnetic waves having a resonant frequency and outputs the electromagnetic waves via the feed line having a line impedance with a line impedance value. The supply is arranged between the feed line and the antenna and transmits the electromagnetic waves from the feed line to the antenna. The supply has a resonant circuit. The resonant circuit and the antenna together have a resonant input impedance in the transmission direction. The resonant circuit transforms the resonant input impedance at the resonant frequency into a real impedance having a predetermined resonant impedance value. The antenna has an antenna resonant frequency different from the resonant frequency.

19 Claims, 4 Drawing Sheets

4
3
2
1
7
5
6

(56) References Cited

U.S. PATENT DOCUMENTS

| | | | | |
|---|---|---|---|---|
| 8,761,663 | B2 * | 6/2014 | Kaplan | H01Q 1/3275 342/75 |
| 2005/0019900 | A1 * | 1/2005 | Broyer | G01F 23/263 435/287.1 |
| 2010/0313653 | A1 * | 12/2010 | Palata | G01F 23/26 73/304 C |
| 2012/0169527 | A1 * | 7/2012 | Edvardsson | G01F 23/284 342/124 |
| 2014/0102181 | A1 | 4/2014 | Mohajer | |
| 2016/0178553 | A1 * | 6/2016 | Bommarito | G01N 27/225 73/335.04 |
| 2018/0031406 | A1 * | 2/2018 | Blödt | H01Q 1/225 |
| 2018/0224316 | A1 * | 8/2018 | Convent | G01F 23/2845 |
| 2019/0017952 | A1 | 1/2019 | Noel et al. | |
| 2019/0187071 | A1 | 6/2019 | Blödt et al. | |
| 2019/0393581 | A1 * | 12/2019 | Moallem | H05K 1/0242 |

* cited by examiner

FILL LEVEL SENSOR FOR DETECTING A FILL LEVEL OF A FILL MEDIUM IN A CONTAINER

TECHNICAL FIELD

The invention relates to a fill level sensor for detecting a fill level of a fill medium in a container.

BACKGROUND

The fill level sensor has a generator with a feed line, an antenna, a supply and a controller. The generator, the antenna, the supply and the controller are essential components of the fill level sensor.

The generator is designed both to generate electromagnetic waves with a resonant frequency and to output the electromagnetic waves via the feed line. In this case, the feed line has a line impedance with a line impedance value.

The feed is located between the feed line and the antenna and is designed to transmit electromagnetic waves from the feed line to the antenna. For example, the feed is another feed line.

The antenna is designed to radiate the electromagnetic waves into a container with a fill medium.

Electromagnetic waves are transmitted in a transmission direction from the feed line via the supply to the antenna. The electromagnetic waves radiated by the antenna have a direction of propagation that is at least essentially the same as the direction of transmission.

The controller is designed to detect a change in a near field around the antenna of electromagnetic waves radiated by the antenna due to a change in the fill level of a fill medium in a container. The controller is further designed to detect a fill level of the fill medium in the container by evaluating the detected change of the near field.

The near field is formed by the electromagnetic waves emitted by the antenna and the change in the near field is caused by the fill level change of the fill medium in the container. The fill level change of the fill medium displaces another medium, for example air, in the vicinity of the antenna by the fill medium or vice versa. A fill level change of the fill medium in the vicinity of the antenna changes the near field of the antenna if the fill medium and the other medium have different permittivities from one another. This is assumed in the following.

A change in the near field of the antenna also causes a change in a matching of the antenna, which also changes a reflected power over frequency. Thus, either an absolute reflected power at a frequency or a variation of reflected power over frequency can be used to detect a fill level of a fill medium in a container. However, the use of absolute reflected power at a frequency is susceptible to tolerances and environmental conditions. This is not the case with a progression of reflected power over frequency and, in addition, a distinction can be made between different filling media if they have different permittivities.

Prior art fill level sensors with planar patch antennas as antennas in combination with surface acoustic wave resonators are known. Patch antennas are half wavelength resonators. Fill level sensors with quarter wavelength resonators as antennas are also known. A disadvantage of these fill level sensors is a sensitivity to changes in the near field around the antenna, which only ensures detection of fill levels of fill media whose permittivity is greater than a certain permittivity value, so that these fill level sensors are not suitable for fill media with lower permittivity. Furthermore, patch antennas generate parasitic resonances, especially in a small container, making it difficult to detect a fill level of a medium in the container. Furthermore, the implementation of patch antennas with high sensitivity separated from a medium in a container is difficult.

SUMMARY

One object of the present invention is therefore to provide a fill level sensor with increased sensitivity so that it is also suitable for media with lower permittivity.

The object is achieved by a fill level sensor with the disclosed features.

In the fill level sensor according to the invention, the supply has a resonant circuit. The resonant circuit and the antenna together have a resonant input impedance in the transmission direction. The resonant circuit transforms the resonant input impedance at the resonant frequency to a real impedance having a predetermined resonant impedance value. The antenna has an antenna resonant frequency different from the resonant frequency. In this case, the near field of the antenna is free from being affected by a fill medium and is instead surrounded by another medium or a vacuum. The other medium is preferably air. It must be taken into account that the other medium and the fill medium have different permittivities from one another. A change in the near field around the antenna due to a change in the fill level of a fill medium, for example in the direction of the antenna, causes a decrease in the resonant frequency if the previously performed transformation was carried out with air as the other medium and the fill medium has a greater permittivity than air.

Accordingly, the resonant frequency is not a fixed frequency, but lies in a resonant frequency range and the generator is designed to generate electromagnetic waves in this resonant frequency range. The respective resonant frequency depends on the near field of the antenna.

For example, the design of the controller to detect a change in the near field around the antenna includes an evaluation of the resonant input impedance.

The fill level sensor according to the invention has the advantage over the described fill level sensor known from the prior art of an increased sensitivity for changes in the near field around the antenna, so that it also ensures the detection of fill levels of fill media with lower permittivity.

In one design of the fill level sensor, it is provided that the supply additionally comprises a terminating circuit. The terminating circuit, the resonant circuit and the antenna together then have a terminating input impedance in the transmission direction. The terminating circuit sets the terminating input impedance to the line impedance value. For example, if the line impedance value of the feed line is 50 ohms, then a terminating input impedance value is also 50 ohms. Thus, no reflections occur at a junction between the supply and the feed line. The design of the controller to detect a change in the near field around the antenna includes, for example, an evaluation of a shift in the resonant frequency. The decrease of the resonant frequency described above is such a shift.

In a further development of the above design, it is provided that the terminating circuit has a quarter wavelength line. In this case, the quarter wavelength line is preferably implemented using an air gap. In a particularly preferred design, the terminating circuit comprises a quarter wavelength line.

In a further design, it is provided that the antenna resonant frequency is greater than the resonant frequency. This has the advantage that the antenna is smaller than if the antenna resonant frequency were smaller than the resonant frequency. Another advantage is that the resonant frequency range is larger. Otherwise, the resonant frequency range would be limited to a frequency range between the antenna resonant frequency and the first harmonic wave.

In principle, the generator is designed to produce electromagnetic waves with any resonant frequency. However, resonance frequencies that lie in a frequency range of microwaves have proven particularly useful for detecting a fill level of a medium in a container. A frequency range of microwaves is, for example, the frequency range from 1 GHz to 300 GHz. Therefore, in one design of the fill level sensor, it is provided that the generator is designed to generate electromagnetic waves with a resonance frequency that lies in a frequency range of microwaves.

In a further design, the antenna is designed for direct contact with the fill medium. The alternative to direct contact is indirect contact of the antenna with the fill medium. Direct contact has the advantage over indirect contact that smaller changes in the near field around the antenna can be detected, which further increases sensitivity. This ensures the detection of fill levels of filling media with even lower permittivity.

In a further design, it is provided that the controller is additionally designed to signal the detected fill level of a fill medium. For example, the controller has a bus interface and signaling is carried out by transmitting a corresponding bus message via the bus interface and a bus to a control room, where it is then displayed for a user.

In a further design, it is provided that the feed has a cylindrical inner conductor and a hollow cylindrical outer conductor for transmitting the electromagnetic waves. Further, the outer conductor and the inner conductor are arranged coaxially with respect to one another. Consequently, the outer conductor is arranged around the inner conductor. Such a coaxial feed has advantageous properties for the transmission of electromagnetic waves.

Preferably, a section of the inner conductor then also forms the antenna. Fill level sensors known from the prior art have planar patch antennas as antennas. Compared to a planar patch antenna, the section of the inner conductor used as the antenna is smaller, which means that the fill level sensor is also smaller. Due to the smaller size, the fill level sensor is also suitable for applications that offer only a correspondingly small amount of installation space. Furthermore, in contrast to a patch antenna, only a near field is excited by the section of the inner conductor as antenna, which is why the antenna is also suitable for correspondingly smaller containers.

In a further design of the fill level sensor, it is provided that the resonant circuit and/or the terminating circuit is/are arranged between the inner conductor and the outer conductor. This arrangement of the resonant circuit and/or the terminating circuit results in a further reduction of the size of the fill level sensor and causes advantageous electrical properties for the electromagnetic waves.

Often fill levels of filling media in containers have to be determined, wherein the filling media have temperatures, especially high temperatures, which represent a thermal stress for the generator and the controller, for example, and impair their functions. Since the terminating input impedance is set to the line impedance value, no reflections occur at the junction between the supply and the feed line, which is why the generator and also the controller can be arranged at a distance from the supply, wherein they are thermally decoupled from fill media and their thermal load is reduced.

In order to also reduce the thermal load on the supply, it is provided in one design of the fill level sensor that the outer conductor has cooling fins. These cooling fins are designed to dissipate heat transferred from a fill medium to the supply to an environment of the fill level sensor.

In a further design of the fill level sensor, it is provided that the resonant circuit comprises a dielectric and a high-frequency absorber. In this case, the dielectric is preferably a glass, in particular a metal-fused glass. If the fill level sensor has the coaxial supply described above, then in a particularly preferred design, the resonant circuit comprises the dielectric, the high-frequency absorber and the inner conductor.

A container with an interior for a fill medium, in which a fill level of the fill medium is to be detected, has a wall on which the fill level sensor is arranged. If the antenna of the fill level sensor is to be in direct contact with the fill medium at a certain level, there must be an opening in the wall of the container. Therefore, in a further design, the fill level sensor has a process window which closes the opening in the wall of a container and arranges the antenna in the interior of the container.

In a further development of the above design in conjunction with a resonant circuit comprising a dielectric, it is provided that the dielectric is additionally also the process window. The dielectric ensures effective, robust and chemically resistant separation of the remaining fill level sensor from the medium.

In a further design, it is provided that the resonance impedance value is in the interval of 150 ohms to 300 ohms.

In prior art fill level sensors, which are arranged on a container, it often occurs that the near field around the antenna is affected by excitation of higher modes of the electromagnetic waves in the container, which are excited by the radiated electromagnetic waves especially in the area of a transition of the supply and/or antenna into the container. The excitation occurs due to discontinuities of an electromagnetic field of the electromagnetic waves at the transition. Higher modes are modes above the fundamental mode of an electromagnetic wave. Also the container itself is often a waveguide for the transmission of electromagnetic waves. If waveguide modes are now excited by the electromagnetic waves in the container, standing waves can form in the container, leading to ambiguities in the detection of a change in the near field. If the container is a hollow cylinder, the fundamental mode is calculated using the following formula:

$$f = \frac{1,8412 \cdot c_0}{2\pi \cdot r \cdot \sqrt{\varepsilon_r}}$$

Thus, in order to avoid waveguide modes in a container, it is provided in a further design that the fill level sensor has a mode filter at the antenna and that the mode filter is designed to avoid the excitation of higher modes of the electromagnetic waves in a container.

In a further design, it is provided that the mode filter has a horn with a horn interior, that the antenna extends into the horn interior, and that the horn interior expands continuously in the transmission direction. In this case, the electromagnetic waves emitted by the antenna are guided by the horn in the horn interior, whereby discontinuities for the electromagnetic waves at the transition from the antenna into the container are in any case reduced or even avoided.

Preferably, a cross-sectional area is circular with respect to the transmission direction of the horn interior and a radius of this cross-sectional area is determined taking into account a geometry of an interior of a container and a highest permittivity of a fill medium to be assumed, so that only an excitation of propagatable higher modes of the electromagnetic waves lying above the fundamental mode takes place in the container, the frequencies of which lie above the resonance frequency. Preferably, the radius is a minimum radius of the horn interior. Since the horn interior continuously expands in the direction of transmission, the minimum radius of the horn interior is at the end of the horn into which the antenna projects.

In a further design, it is provided that the horn has recesses for the penetration of a fill medium into the horn interior. This ensures that no gas pockets are formed in the horn interior when the fill level of a fill medium changes in the area of the horn, but that the horn interior is filled with the fill medium according to the fill level of the fill medium.

BRIEF DESCRIPTION OF THE DRAWINGS

In detail, there is a plurality of possibilities for designing and further developing the fill level sensor. Reference is made to the following description in connection with the drawings.

DETAILED DESCRIPTION

Figure 1:
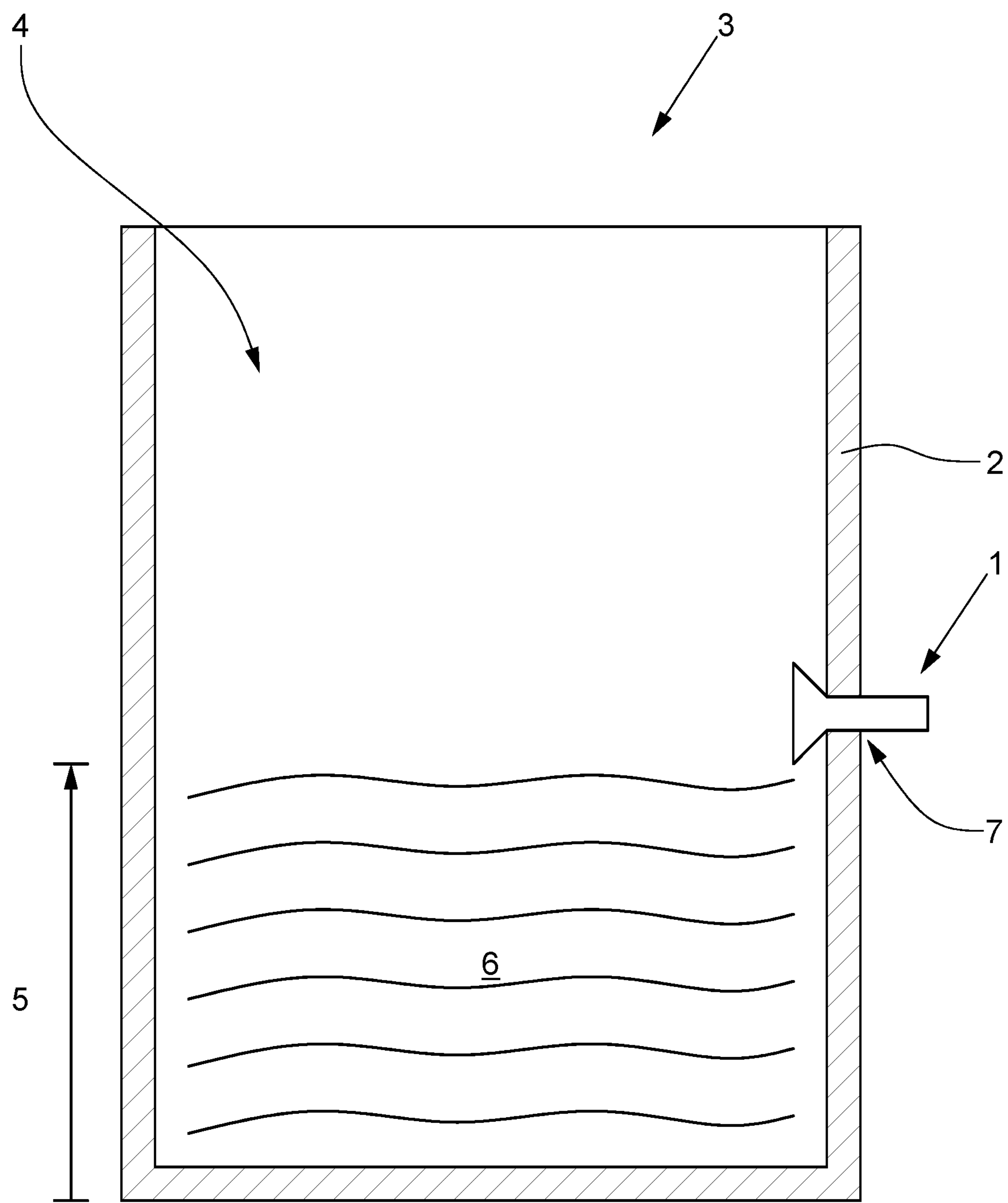
FIG. 1 illustrates an embodiment of a fill level sensor arranged in a wall of a container.

FIG. 1 shows an abstracted embodiment of a fill level sensor 1 for detecting a fill level of a fill medium in a container. The fill level sensor 1 is arranged on a wall 2 of a container 3. The container 3 has an interior 4. The interior 4 has a fill level 5 of a fill medium 6. As another medium, air is above the fill medium 6. The fill medium 6 and the air have permittivities different from one another. An opening 7 is formed in the wall 2 of the container 3 through which the fill level sensor 1 has access to the interior 4 of the container 3.

Figure 2:
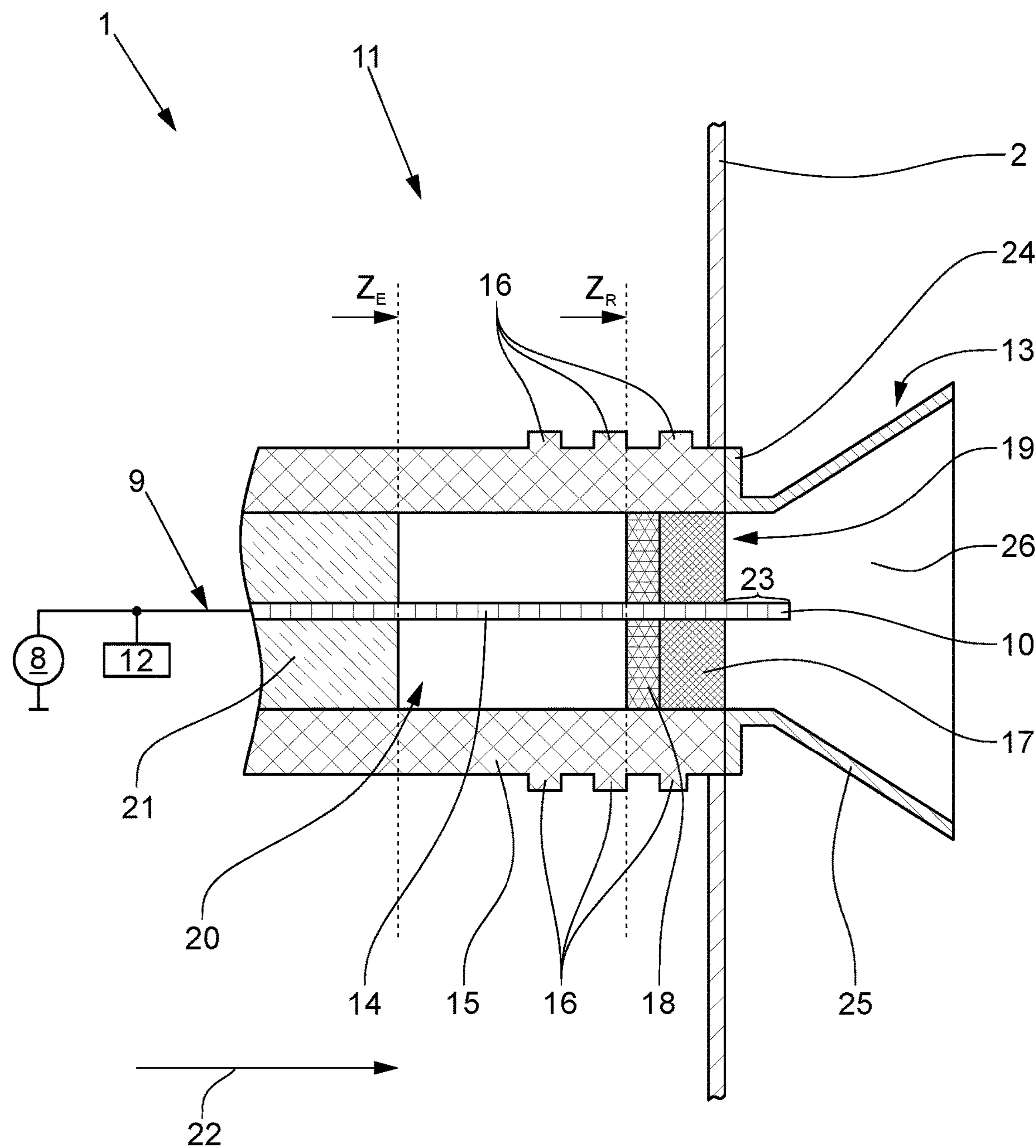
FIG. 2 illustrates a sectional view of the filling fill level sensor of FIG. 1.

FIG. 2 shows an abstracted longitudinal section of the fill level sensor 1 of FIG. 1. The fill level sensor 1 has a generator 8 with a feed line 9, an antenna 10, a supply 11, a controller 12 and a mode filter 13. The generator 8 is designed to generate electromagnetic waves with a resonant frequency and to output them via the feed line 9. The resonant frequency is 6 GHz, which is in a frequency range of microwaves. The feed line 9 has a line impedance with a line impedance value of 50 ohms.

The supply 11 is arranged between the feed line 9 and the antenna 10 and is designed to transmit the electromagnetic waves from the feed line 9 to the antenna 10.

The supply 11 has a cylindrical inner conductor 14 and a hollow cylindrical outer conductor 15 for transmitting the electromagnetic waves. The outer conductor 15 and the inner conductor 14 are arranged coaxially with one another and have circular cross-sectional contours. Further, the outer conductor 15 has cooling fins 16. The cooling fins 16 are designed to dissipate heat, which is transferred from the fill medium 6 to the supply 11, to the environment. The supply 11 further has a dielectric 17 in the form of a metal-fused glass and a high-frequency absorber 18. In this regard, the dielectric 17 also serves as a process window. Together with the outer conductor 15, the dielectric 17 closes the opening 7 in the wall 2 of the container 3. Accordingly, the dielectric 17 is also designed to be resistant to the fill medium 6 and to the pressure and temperature in the container 3. Both the dielectric 17 and the high-frequency absorber 18 are annular and arranged between the cylindrical inner conductor 14 and the hollow cylindrical outer conductor 15.

The supply 11 has a resonant circuit 19 and a terminating circuit 20. The resonant circuit 19 comprises the dielectric 17 and the high-frequency absorber 18. The terminating circuit 20 has a quarter wavelength line, and this is implemented using an air gap. Thus, both the resonant circuit 19 and the terminating circuit 20 are disposed between the inner conductor 14 and the outer conductor 15. In the present embodiment, the feed line 9 has the same inner conductor 14 and the same outer conductor 15 as the supply 11 and a feed dielectric 21 between the inner conductor 14 and the outer conductor 15. Also, the feed line 9 is shown as a simple line in the region of the generator 8 and the controller 12.

A transmission of the electromagnetic waves in a transmission direction 22 takes place from the feed line 9 via the supply 11 to the antenna 10. The antenna 10 is designed to radiate the electromagnetic waves into the interior 4 of the container 3 with the fill medium 6. A section 23 of the inner conductor 14 forms the antenna 10 in that the section 23 extends beyond the dielectric 17 in the transmission direction 22. The antenna 10 is designed for direct contact with the fill medium 6. When the fill level 5 of the fill medium 6 is sufficiently high, the antenna 10 is in direct contact with the fill medium 6.

In the transmission direction 22, the resonant circuit 19 and the antenna 10 together have a resonant input impedance ZR. In particular, the antenna provides a capacitive contribution to the resonant input impedance ZR. The resonant circuit 19 transforms the resonant input impedance ZR at the resonant frequency and without any influence of the near field of the antenna 10 by the fill medium 6 into a real impedance with a predetermined resonant impedance value ZR=200 ohms. Accordingly, the transformation takes place before a fill level 5 of the fill medium 6 is detected, i.e., before the fill level sensor 1 is used productively.

In the transmission direction 22, the terminating circuit 20, the resonant circuit 19, and the antenna 10 collectively have a terminating input impedance ZE. The terminating circuit 20 sets the terminating input impedance ZE to the line impedance value of 50 ohms. Since the line impedance of the feed line 9 and the terminating input impedance ZE are the same, the electromagnetic waves do not generate reflections at the transition from the feed line 9 to the supply 11.

The supply 11 with its essential components cylindrical inner conductor 14, hollow cylindrical outer conductor 15, annular dielectric 17 and annular high-frequency absorber are thus coaxially formed.

The controller 12 is designed to detect a change in a near field around the antenna 10 of electromagnetic waves radiated by the antenna 10 by a change in the fill level 5 of the fill medium 6 in the interior 4 of the container 3. A change of the near field is caused by a change of the fill level 5 of the fill medium 6 in the interior 4 of the container 3 in the vicinity of the antenna 10, since the fill medium 6 and air have different permittivities from one another.

A change in the near field causes a change in the matching of the antenna 10, which also causes a change in a reflected power over frequency. A change in the near field around the antenna 10 due to a change in the fill level 5 of the fill medium 6, for example, in the direction of the antenna 10, causes a decrease in the resonant frequency. To detect a change in reflected power, the controller 12 is connected to the feed line 9 in the present embodiment.

Furthermore, the controller 12 is designed to detect the fill level of the fill medium 6 in the interior 4 by evaluating the detected change in the near field. The controller 12 is also designed to signal the detected fill level of the fill medium 6.

Figure 3A:
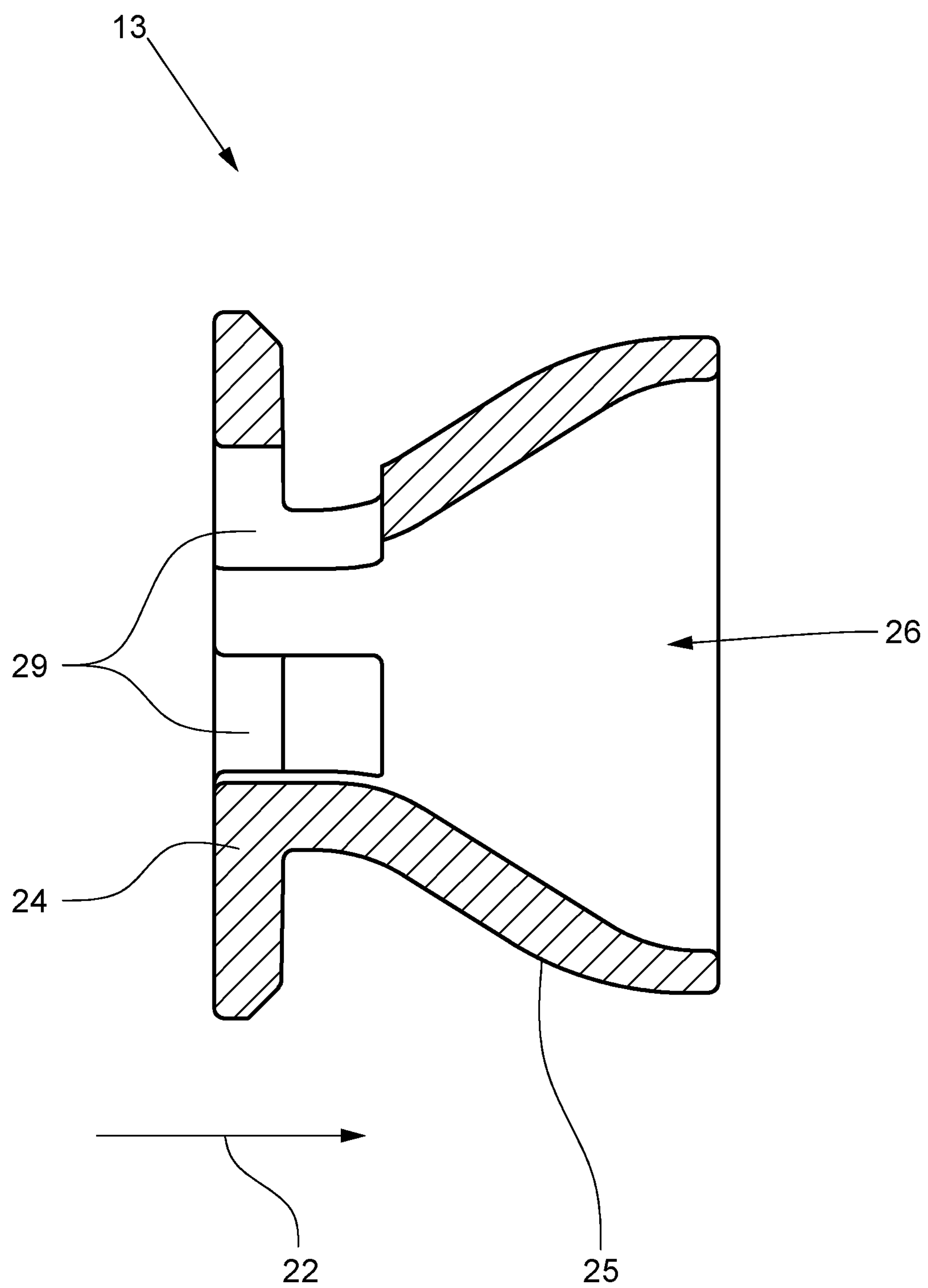
FIG. 3*a* illustrates a mode filter in a sectional view.
Figure 3B:
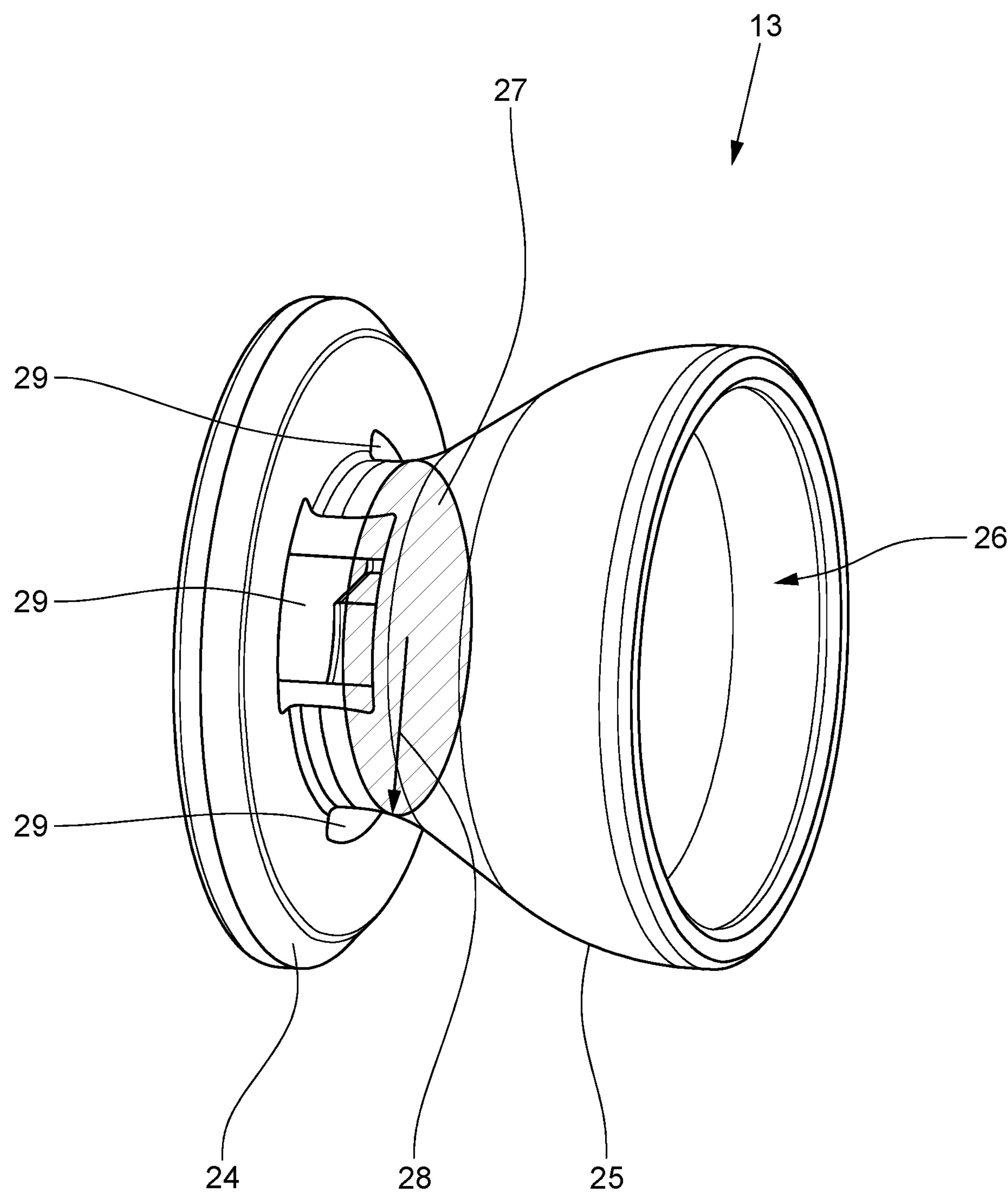
FIG. 3*b* illustrates the mode filter of FIG. 3A in a perspective view.

FIG. 3*a* is a longitudinal section through an embodiment of a mode filter 13 and FIG. 3*b* is a perspective view of this mode filter 13. The mode filter 13 is designed to prevent propagation of higher modes of electromagnetic waves in the interior 4 of the container 3. The mode filter 13 has a collar 24 and a horn 25 with a horn interior 26. The horn interior 26 guides the electromagnetic waves radiated from the antenna 10. In this embodiment, the collar 24 is used to arrange the mode filter 13 on the supply 11. In other embodiments, it is used to arrange it on the wall 2 of the container 3. When the mode filter 13 is arranged, the antenna 10 extends into the horn interior 26. The horn interior 26 expands continuously in the transmission direction 22.

In this embodiment, the horn interior 26 is rotationally symmetrical with respect to the propagation direction 22. Thus, all cross-sectional areas are circular with respect to the transmission direction 22 of the horn interior 26. In particular, a cross-sectional area 27 is circular with respect to the transmission direction 22 of the horn interior 26 and a radius 28 of the cross-sectional area 27 is determined taking into account a geometry of the interior 4 of the container 3 and a highest permittivity of the fill medium 6 to be assumed such that propagation of higher modes of the electromagnetic waves in the interior 4 of the container 3 is avoided. The radius 28 is a minimum radius of the horn interior 26. The antenna 10 passes through the cross-sectional area 27, so it is in the horn interior 26 where this has the minimum radius.

The horn 13 has three recesses 29 for penetration of the fill medium 6 into the horn interior 26. This ensures that changes in the fill level 5 of the fill medium 6 in the area of the horn 25 do not result in air pockets in the horn interior 26, but that the horn interior 26 is filled with the fill medium 6 according to the fill level 5 of the fill medium 6.

The invention claimed is:

1. A fill level sensor for detecting a level of a fill medium in a container, comprising:
- a generator having a feed line;
- an antenna;
- a supply; and
- a controller;
- the generator is designed to generate electromagnetic waves having a resonant frequency and output the electromagnetic waves via the feed line having a line impedance with a line impedance value;
- the supply is arranged between the feed line and the antenna and is designed to transmit the electromagnetic waves from the feed line to the antenna;
- the antenna is designed to radiate the electromagnetic waves into a container with a fill medium;
- a transmission of the electromagnetic waves occurs in a transmission direction from the feed line via the supply to the antenna;
- the controller is designed to detect a change of electromagnetic waves radiated by the antenna in a near field around the antenna by a fill level change of a fill medium in a container and to detect a fill level of the fill medium in the container by evaluating the detected change in the near field;
- the supply has a resonant circuit;
- the resonant circuit and the antenna together has a resonant input impedance in the transmission direction, and the resonant circuit transforming the resonant input impedance at the resonant frequency into a real impedance has a predetermined resonant impedance value; and
- the antenna has an antenna resonant frequency different from the resonant frequency.

2. The fill level sensor according to claim 1, wherein the supply comprises a terminating circuit; and
- wherein the terminating circuit, the resonant circuit and the antenna together have a terminating input impedance in the transmission direction and the terminating circuit sets the terminating input impedance to the line impedance value.

3. The fill level sensor according to claim 2, wherein the terminating circuit has a quarter wavelength line implemented using an air gap.

4. The fill level sensor according to claim 1, wherein the antenna resonant frequency is greater than the resonant frequency.

5. The fill level sensor according to claim 1, wherein the resonant frequency is in a frequency range of microwaves.

6. The fill level sensor according to claim 1, wherein the antenna is designed for direct contact with the fill medium.

7. The fill level sensor according to claim 1, wherein the controller is designed to signal the detected fill level of the fill medium.

8. The fill level sensor according to claim 1, wherein the supply has a cylindrical inner conductor and a hollow cylindrical outer conductor for transmitting the electromagnetic waves, and the outer conductor and the inner conductor are arranged coaxially with respect to one another.

9. The fill level sensor according to claim 8, wherein a section of the inner conductor forms the antenna.

10. The fill level sensor according to claim 8, wherein at least one of the resonant circuit and the terminating circuit is arranged between the inner conductor and the outer conductor.

11. The fill level sensor according to claim 8, wherein the outer conductor has cooling fins.

12. The fill level sensor according to claim 1, wherein the resonant circuit has a dielectric and a high-frequency absorber, wherein the dielectric is preferably a glass, in particular a metal-fused glass.

13. The fill level sensor according to claim 12, wherein the dielectric is also a process window.

14. The fill level sensor according to claim 1, wherein the resonance impedance value is in an interval from 150 ohms to 300 ohms.

15. The fill level sensor according to claim 1, wherein the fill level sensor has a mode filter at the antenna and that the mode filter is designed to avoid waveguide modes in a container.

16. The fill level sensor according to claim 15, wherein the mode filter has a horn with a horn interior; and
- wherein the antenna extends into the horn interior, and that the horn interior widens continuously in the transmission direction.

17. The fill level sensor according to claim 16, wherein a cross-sectional area is circular with respect to the transmission direction of the horn interior; and wherein a radius of the cross-sectional area is determined taking into account a geometry of an interior of a container and a highest permittivity to be assumed of a fill medium such that excitation of waveguide modes in the container is avoided.

18. The fill level sensor according to claim 17, wherein the radius is a minimum radius of the horn interior.

19. The fill level sensor according to claim 16, wherein the horn has recesses for penetration of a fill medium into the horn interior.

* * * * *